United States Patent [19]

Kogure et al.

[11] Patent Number: 4,544,972
[45] Date of Patent: Oct. 1, 1985

[54] SWINGING ACTUATORS FOR USE IN MAGNETIC DISC TYPE MEMORY DEVICES

[75] Inventors: Kenji Kogure, Sekimachi; Takao Kakizaki, Tokorozawa; Yasunaga Mitsuya, Sekimachi; Shigemitsu Oguchi; Koji Otani, both of Tokorozawa, all of Japan

[73] Assignee: Nippon Telegraph & Telephone Public Corporation, Tokyo, Japan

[21] Appl. No.: 400,148

[22] Filed: Jul. 20, 1982

[30] Foreign Application Priority Data

Jul. 30, 1981 [JP] Japan ................. 56-119905

[51] Int. Cl.$^4$ ............ G11B 5/54; G11B 21/08; G11B 5/55
[52] U.S. Cl. ...................... 360/105; 360/106
[58] Field of Search .............. 360/105, 106, 107, 109, 360/75, 98, 129, 78; 310/13

[56] References Cited

U.S. PATENT DOCUMENTS

| | | | |
|---|---|---|---|
| 4,075,517 | 2/1978 | Adler | 360/106 |
| 4,136,293 | 1/1979 | Patel | 310/13 |
| 4,190,870 | 2/1980 | Avina et al. | 360/98 |
| 4,285,018 | 8/1981 | Mulvany et al. | 360/98 |
| 4,300,176 | 11/1981 | Gilovich | 360/105 |
| 4,331,991 | 5/1982 | Morehouse | 360/106 |

FOREIGN PATENT DOCUMENTS 54-66413 5/1979 Japan .
56-44170 4/1981 Japan .

*Primary Examiner*—Robert M. Kilgore
*Attorney, Agent, or Firm*—Blakely, Sokoloff, Taylor & Zafman

[57] ABSTRACT

A magnetic disc type memory device swinging actuator is constituted by a plurality of a driving assemblies juxtaposed on a stationary shaft and extending in the opposite direction. Each driving assembly include a head arm, a magnetic head mounted on one end of the head arm, a coil supporting member for supporting a flat coil and extending in the opposite direction to the head arm, and first and second permanent magnets spaced from the coil in an axial direction of the shaft and also spaced in a direction of arrangement of the flat coil. The first and second permanent magnets are magnetized in the axial direction of the shaft so that poles of opposite polarities confront the flat coil. The first and second permanent magnets are mounted on a common yoke and the flat coils are disposed in a closed magnetic flux path including the first and second permanent magnets and the yokes.

9 Claims, 11 Drawing Figures

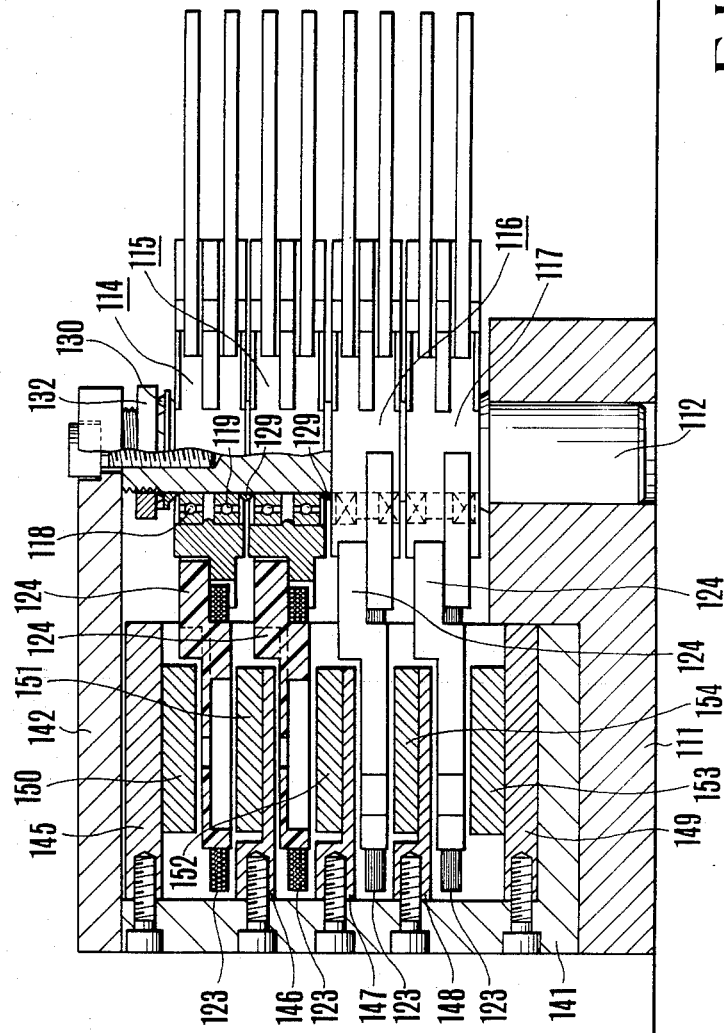

SWINGING ACTUATORS FOR USE IN MAGNETIC DISC TYPE MEMORY DEVICES

BACKGROUND OF THE INVENTION

This invention relates to a swinging actuator for use in a magnetic disc type memory device, and more particularly a swinging actuator of the type wherein a carriage, that is a driving assembly including a magnetic head is inserted into gaps between stacked magnetic disc by a rotary motion so as to position the magnetic head mounted on the tip of the carriage at a predetermined position confronting respective discs by arcuately moving the magnetic head along the surfaces of the discs.

In recent years, efforts are concentrated to the improvement of the magnetic disc materials, and the improvement of the writing and reading device of the disc so as to provide a large capacity and high speed magnetic disc type memory device by storing informations at a high density and by reducing the access time.

As a result of constant improvement, at present a magnetic disc type memory device has been developed having a capacity of 3.2 giga bytes (8 disc units each having a capacity of 400 mega bytes are mounted) and an access performance of 20–30 times/giga byte/sec.

The term access performance is used herein, to mean the number of times of processing a unit information quantity per unit time. In a magnetic disc memory device the access performance usually tends to decrease as the memory capacity increases so that in order to increase the capacity and speed, the access performance should be improved. To solve this problem, it has been proposed to mount a plurality of magnetic heads on one arm of an actuator for narrowing the ranges of movements of respective magnetic heads for corresponding disc so as to reduce the access time or seek time.

According to this method, however, although the access time can be reduced by increasing the number of magnetic heads since the carriages carrying a plurality of magnetic heads constitute one actuator, there is a limit for the increase of the access performance.

Accordingly, it has also been proposed to divide a plurality of stacked magnetic discs into two groups, one actuator is provided for each group and the actuators are disposed at proper positions about the periphery of the discs. This type of the actuator is disclosed in Japanese laid open patent specification No. 44170 of 1981, for example.

In the actuator of this type a plurality of arms each supporting magnetic heads corresponding to respective magnetic discs are secured to one shaft, and the shaft, that is all arms are simultaneously rotated in accordance with an external control signal for moving respective magnetic head along the surfaces of corresponding magnetic discs. In this construction, however, since the respective actuators are disposed about the stack of the magnetic discs with a substantial spacing therebetween the size of the magnetic disc type memory device is considerably larger than that utilizing a single actuator.

SUMMARY OF THE INVENTION

Accordingly, it is a principal object of this invention to provide a swinging actuator for use in a magnetic disc memory device capable of improving the access performance and decreasing the size.

Another object of this invention is to provide an improved actuator for use in a magnetic disc type memory device capable of accomplishing the object mentioned with simple construction.

To accomplish these objects, according to this invention, driving assemblies for a plurality of magnetic heads are mounted on a single shaft respectively through bearings. This construction permits to gather at a point a plurality of independently swingable driving assemblies.

According to this invention, there is provided a swinging actuator for use in a magnetic memory device, characterized by comprising a stationary shaft; at least two driving assemblies juxtaposed on the stationary shaft and extending in the opposite directions on both sides of the shaft; each driving assembly including a head arm, a magnetic head mounted on one end of the head arm, a flat coil, a coil supporting member supporting the coil and extending on one side of the shaft opposite to the head arm, and first and second permanent magnets spaced from the coil in an axial direction of the shaft, the first and second permanent magnets being spaced in a direction of arrangement of the flat coil and magnetized in the axial direction so that poles of the opposite polarities confront the flat coil.

BRIEF DESCRIPTION OF THE DRAWINGS

In the accompanying drawings:

FIGS. 8 and 9 and FIGS. 10 and 11 show sectional views showing still another modifications of this invention.

DESCRIPTION OF THE PREFERRED EMBODIMENT

Figure 1:
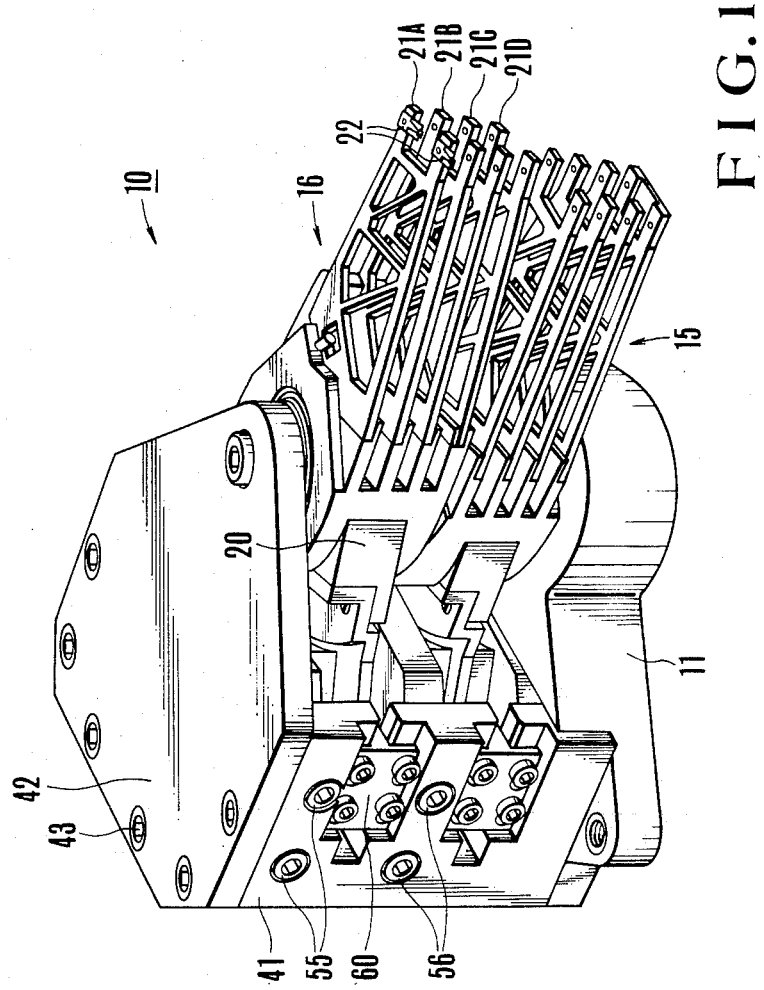
FIG. 1 is a perspective view showing one embodiment of the swinging actuator according to this invention and used in a magnetic disc type memory device.
Figure 2:
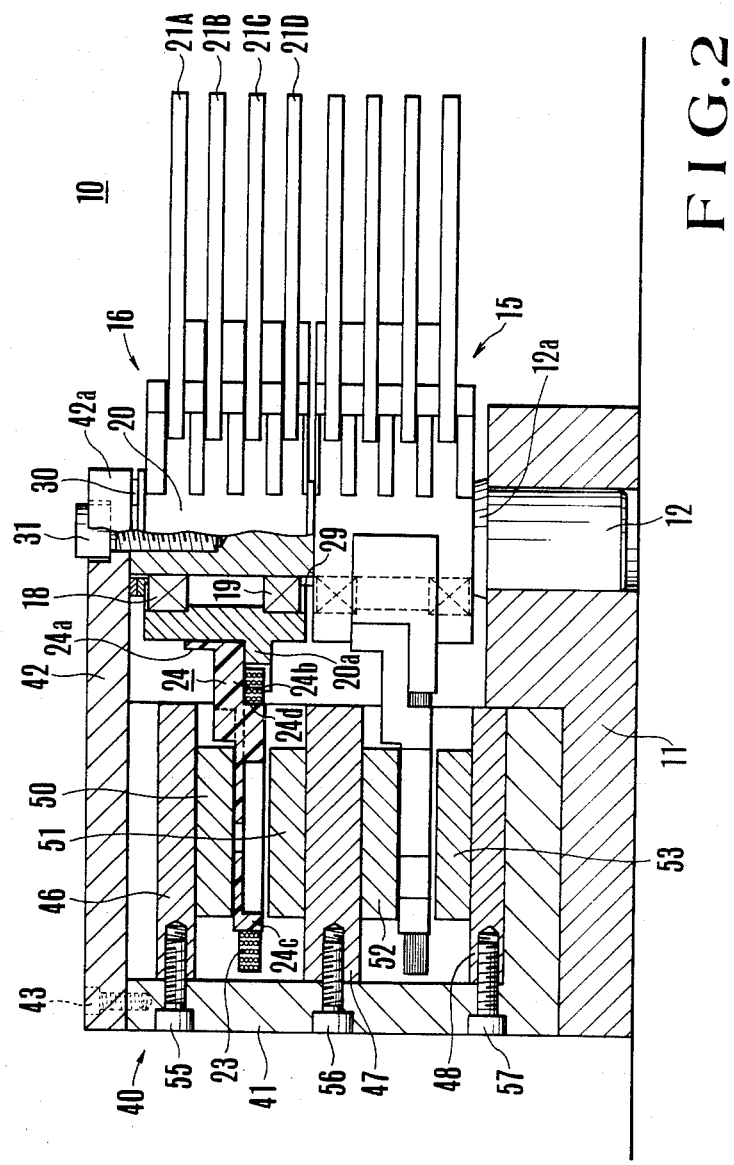
FIG. 2 is a side view, a portion cut away, showing the swinging actuator shown in FIG. 1.
Figure 3:
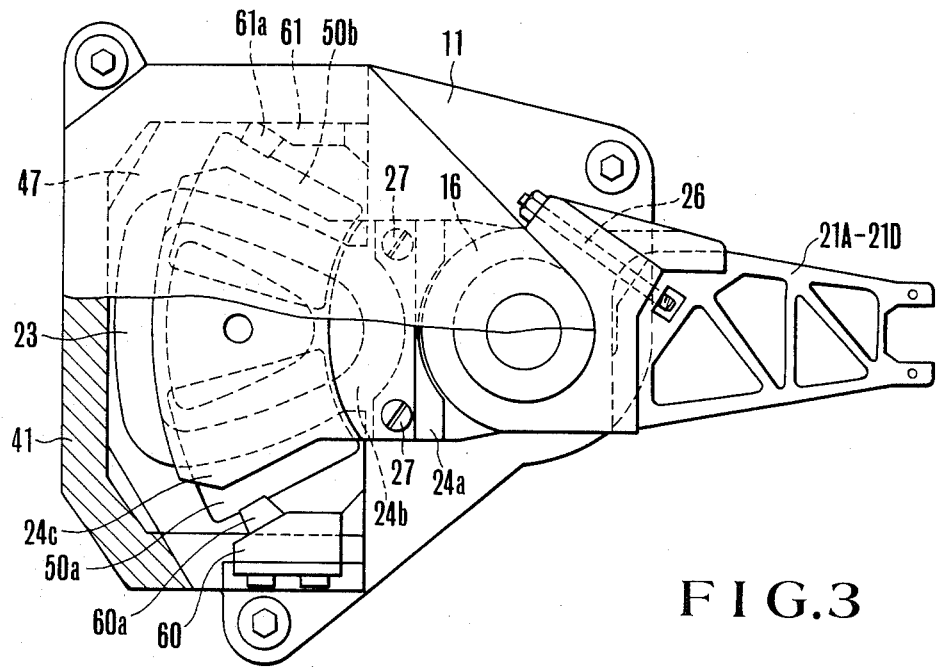
FIG. 3 is an upper plan view, a portion cut away, showing of the swinging actuator shown in FIG. 1.

A preferred embodiment of a swinging actuator 10 shown in FIGS. 1, 2 and 3 is provided with a stationary shaft 12 secured to a subbase 11, and two magnetic head driving assemblies 15 and 16 are mounted on the stationary shaft 12. Since these driving assemblies 15 and 16 have the same construction, in the following, only the driving assembly 16 will be described in detail. The driving assembly 16 comprises a cylindrical rotary carriage 20 rotatably mounted on the stationary shaft 12 via a pair of vertically spaced apart bearings 18 and 19, a plurality of parallel magnetic head arms 21A–21D extending in the horizontal direction, that is perpendicularly to the shaft 12 and a coil supporting arm 24 extending in a direction opposite to that of magnetic head arms 21A–21D and carrying a flat coil 23.

The head arms 21A–21D are plate shaped with their center portions removed to decrease the weight of the assembly, and one or two magnetic heads 22 are mounted on openings at their ends. Since the magnetic head 22 is well known it is not described in detail herein. As shown in FIG. 1 or 3 each of the head arms 21A-21D is secured to the rotary carriage 20 with bolts 26.

As shown in FIG. 2, the coil supporting arm 24 has a stepped sectional configuration, and a bracket 24a extending in the vertical direction along the outer wall of the rotary carriage 20 from one end of a flat portion 24b is used as a guide member for horizontally supporting the coil supporting arm 24, the flat portion 24b being secured to the flange 20a of the rotary carriage 20 by screws 27 (see FIG. 3). A sector shaped flat coil mounting member 24c extends outwardly from the lower portion of the other end of the flat portion 24b. A groove 24d for receiving a flat coil 23 is formed on the lower surface of the coil mounting member 24c, as shown in FIGS. 2 and 3. The flat coil 23 is formed by winding a proper number of turns of a conductor and has a triangular shape with rounded corners and a rectangular cross section. The coil 23 is secured to the groove 24d by using a suitable bonding agent. Then the plane of the flat coil 23 is perpendicular to the axis of the stationary shaft.

The driving assemblies 15 and 16 are fabricated in the following manner. Thus, the driving assembly 15 is firstly mounted on a stop member 12a on the subbase 11 of the stationary shaft 12 and then the driving assembly 16 is mounted with a spacer 29 interposed between the two assemblies 15 and 16. A spring washer 30 is mounted on the assembly 16 and then a connecting plate 42 to be described later is disposed on the top of the stationary shaft 12. By fixing the connecting plate 42 by a bolt 31 the assemblies 15 and 16 are rotatably mounted on shaft 12 with their bearings (in this example 4) applied with a uniform preliminary pressure.

Since the bearings 18 and 19 are positioned in the above described relation they are subjected to both the radial load and thrust load and therefore it is advantageous to use well known angular contact ball bearings or single row deep groove ball bearings.

A magnetic circuit assembly 40 which applies a rotating torque to the driving assemblies 15 and 16 by the interaction with magnetic flux generated by current supplied to the flat coil 23 of the driving assemblies 15 and 16 will now be described.

The magnetic circuit assembly 40 conprises a magnet housing 41, which has a substantially U-shaped sectional configuration, with the bottom surface engaged to the subbase 11. The upper opening of the assembly 40 is closed by a connecting plate 42, the periphery thereof being secured to the magnet housing 41 with screws 43. The projection 42a of the connecting plate 42 near the stationary shaft 12 is positioned adjacent to the upper portion of the stationary shaft 12 and secured thereto with a screw 31.

The magnet housing 41 is constituted by three flat yokes 46, 47 and 48 made of such magnetic material as iron and flat permanent magnet pairs 50, 51, 52 and 53 each made of a rare earth metal-cobalt alloy and secured to either one of the yokes. The flat yokes 46, 47 and 48 are secured to the inner wall of the magnet housing 41 with screws 55, 56 and 57.

Figure 4:
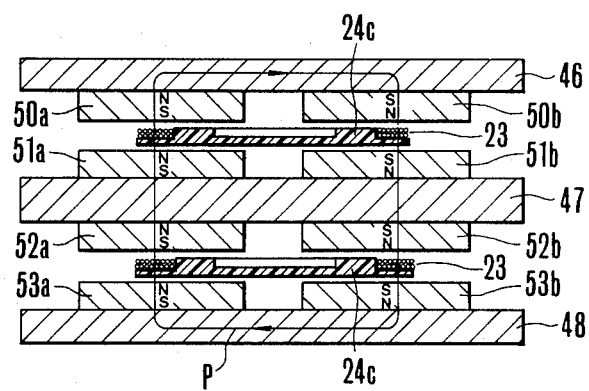
FIG. 4 is a sectional view showing a driving member of the swinging actuator shown in FIGS. 1 to 3.

The permanent magnet pair 50 has a flux density of 9000 gausses and a corecive force of 9000 ersteads and is secured to the lower surface of the yoke 46 with a definite gap (for example 0.5 mm) with the flat coil 23 mounted on the upper surface of the coil supporting arm 24. As shown in FIG. 3, the permanent magnet pair 50 is constituted by a pair of permanent magnets 50a and 50b disposed at a predetermined spacing in the direction of rotation of the coil supporting arm 24, and these permanent magnets 50a and 50b are magnetized in the vertical direction with poles having different polarities opposed to the coil 23. In this example, the permanent magnets are magnetized such that the S pole of the magnet 50a and the N pole of the magnet 50b oppose the flat coil 23. The magnets 50a and 50b are spaced from each other such that they will not be coupled magnetically with each other, and the dimensions of these magnets in the direction of rotation of the coil supporting arm 24 are determined such that the magnetic heads 22 on the magnetic head arms 21A-21D arranged on the opposite side of the shaft 12 with respect to the coil supporting arm 24 can move from the tracks at the peripheries of the magnetic discs to the tracks near the center. Consequently the flat coil 23 is designed to produce a torque necessary to move the magnetic heads 22 across the surfaces of the magnetic discs. The permanent magnet pair 51 is mounted on the upper surface of the yoke 47, the permanent magnet pair 50 is mounted on the lower surface of the yoke 47 while the permanent magnet pair 53 is mounted on the upper surface of the yoke 48 respectively to oppose corresponding flat coils 23 with definite gaps. These permanent magnet pairs respectively comprises two permanent magnets 51a, 51b; 52a, 52b; and 53a, 53b each pair being spaced a definite spacing in the direction of rotation of the coil supporting arm 24. The paired magnets are magnetized in the vertical direction to have opposite polarities in the same manner as the permanent magnet pair 50 described above. This is clearly shown by FIG. 4 showing the essential portions of the magnetic circuit assembly 40.

It is to be noted that the permanent magnets, for example 50a and 51a on the opposite sides of the flat coil 23 have poles of the opposite polarities and that the permanent magnets, for example 51a and 52a on the opposite sides of the yoke 47 have poles of the opposite polarities. When the poles are magnetized in this manner, a closed magnetic flux path P as shown in FIG. 4 would be formed so that the thickness of the yoke 47 can be made to any value without being limited by the design of the magnetic circuit. Because, since no magnetic path is necessary to interconnect magnets 51a and 51b or magnets 52a and 52b. In other words, there is no problem of saturation of the yoke.

On both side surfaces of the magnet housing 41 are secured stop members 60 and 61 which engage side edges of the coil supporting members 24c of respective coil supporting arms 24 to limit the ranges of rotations of respective arms. The stop members 60 and 61 are provided with dampers 60a and 61a made of rubber to resiliently engage the side edges to absorb shock.

With the construction described above, since the driving assemblies 15 and 16 are juxtaposed in the axial direction of a single stationary shaft 12 the swinging actuator may be gathered together at a single position, thus minimizing the size of the magnetic disc device.

Among the elements constituting the driving assemblies 15 and 16 and the magnetic circuit assembly 40, those constituting the drive system of the actuator can be made flat with the result that the swinging actuator can be made compact. This construction can decrease the gaps between the stacked magnetic discs combined with the actuator thereby minimizing the size of the magnetic disc device.

In order to improve the positioning ability of the swinging actuator of a magnetic disc memory device it is necessary to maintain at a constant value up to a high frequency, the transfer function (mechanical impedance) between the coil supporting arm supporting the coil and acting as a force acting point and the tip of the head arm carrying the magnetic head. In other words, the swinging actuator and the stationary shaft 12 supporting the same should have a high rigidity. Increase in the diameter of the shaft 12 can increase the rigidity thereof but the diameter is limited by the geometrical size of the magnetic disc device. Shortening of the length of the stationary shaft 12 is the most effective method of increasing the rigidity thereof and with the construction of this embodiment, as it is possible to decrease the height of the magnetic circuit the stational shaft 12 can be designed to have the minimum length. Thus, the illustrated embodiment has such advantages that the density of the assembled elements is high, that the shaft has a high rigidity, and that the accuracy of positioning is high. These advantages become remarkable when the number of independently swinging actuators is increased.

Multi swinging actuators are required to hage a little transmission of vibrations between adjacent actuators. Since this requirement can be accomplished by increasing the rigidity of the shaft, the large rigidity can decrease mutual interference of the vibrations In this embodiment, the stiffness of the system is increased by coupling together the rigid magnet housing 41 and the upper end of the stationary shaft 12 through a connecting plate 42 to support the shaft at both ends, as above described.

Figure 5:
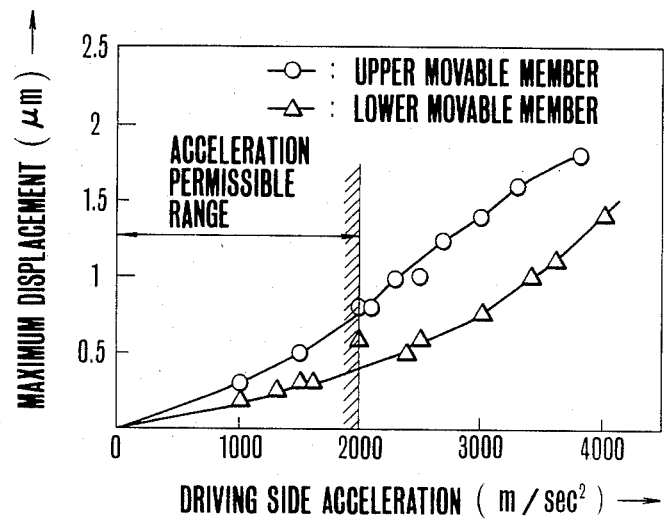
FIG. 5 is a graph showing the relationship between the acceleration of the driving member and the maximum displacement, that is the mutual interference between the swinging actuator shown in FIGS. 1 to 3.

FIG. 5 shows the result of experiment for investigating the mutual interference of the oscillations of swinging members. In one experiment, the displacement of one swinging member was measured when a percussige acceleration was applied to the other swinging member. In FIG. 5, the ordinate represents the maximum displacement in the direction of swinging induced at the tip of the head arm of the one swinging member and the abscissa represents the maximum acceleration applied at the other swinging member. The acceleration of the swinging actuator for use in a magnetic disc member is about 200–300 m/sec$^2$ at the maximum under normal operation and generally is less than 2000 m/sec$^2$ even when the swinging member collides severely due to the abnormal operation of the positioning servo system. As can be noted from FIG. 5, so long as the drive side acceleration of the swinging member is of the order of 300 m/sec$^2$, the maximum displacement of the one swinging member is about at most 0.1 micron, and even when the drive side acceleration reaches 2000 m/sec$^2$, the maximum displacement of the one swinging member is small, of the order of 0.8 microns, meaning that mutual interference of the vibrations is limited to an extremely small value.

Although in this embodiment, two swinging members were stacked, three or more swinging members can also be stacked. Furthermore, in this embodiment 4 headarms were mounted on one movable member, it should be understood that more than 5 or less than 3 head arms can be mounted.

Figure 7:
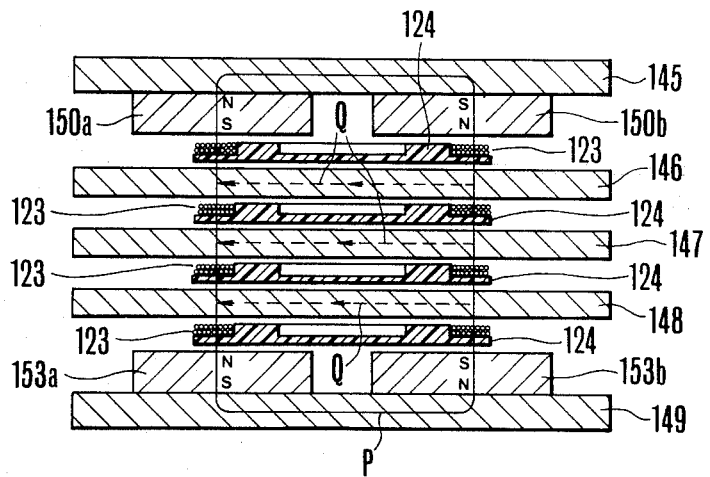
FIG. 7 is a longitudinal sectional view showing the driving member shown in FIG. 6.
Figure 6:
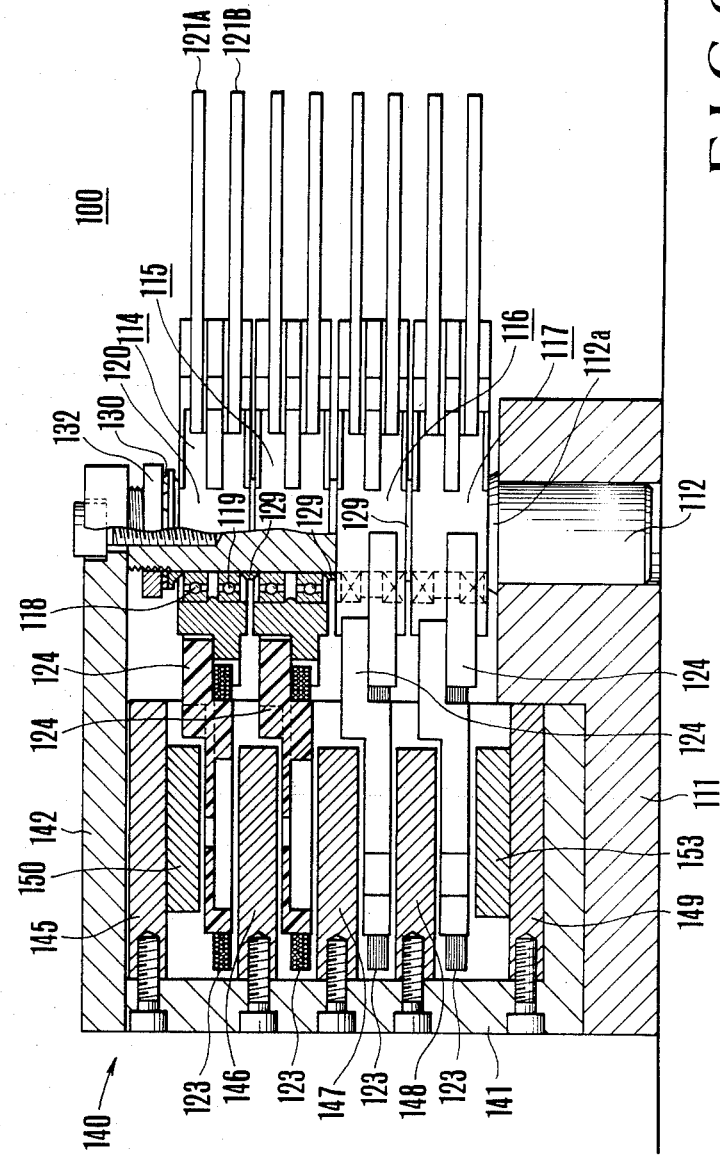
FIG. 6 is a vertical sectional view showing another embodiment of the swinging actuator of this invention.

FIGS. 6 and 7 show another embodiment of this invention in which four set of driving assemblies are mounted on one stationary shaft, each driving assembly carrying two head arms. The actuator 100 shown in FIGS. 6 and 7 comprises a subbase 111, a stationary shaft 112, and four driving assemblies 114, 115, 116 117 juxtaposed on the shaft 112. Like the previous embodiment, each driving assembly comprises a carriage 120 rotatably supported by the stationary shaft 112 through two bearings 118, 119, flat head arms 121A and 121B on the opposite side of the carriage 120, and a coil supporting arm 124 supporting a flat coil 123. These driving assemblies 114–117 are stacked about the stationary shaft 112 via spacers 129 and clamped together by a nut 132 through a spring washer 130. Furthermore, the stationary shaft 112 is provided with a stop member or another washer 112a.

In this embodiment, the magnetic circuit assembly 140 includes five flat yokes 145–149 and permanent magnet pairs 150 and 153 are respectively mounted on the lower surface of the uppermost yoke 145 and the upper surface of the lowermost yoke 149. No permanent magnetic pair is provided for other yokes 146–148. The permanent magnet pairs 150 and 153 respectively comprise two permanent magnets 150a, 150b and 153a, 153b mounted in the direction of rotation of the coil supporting arms 124. As shown in FIG. 7 adjacent magnets of each pair are magnetized to have opposite polarities so as to form a closed magnetic path as shown by arrows in the same manner as in the previous embodiment.

In this embodiment too, as the currents flowing through the flat coils 123 of the driving assemblies 114–117 interact with the flux flowing through the closed magnetic path P, a torque is produced sufficient to move the coils in a predetermined direction. In this embodiment, since the four assemblies are swung independently, the access performance can be improved over the previous embodiment. Furthermore, in this embodiment, since only two pairs of permanent magnets are used the spacing between flat coils can be shortened than that of the preceding embodiment. Accordingly it is possible to decrease the thickness of the actuator to increase the density of the assembled elements and the size of the assembly. In this case, when the thickness of the portion or section which does not contribute to the formation of the closed magnetic path P, for example the thickness of the yoke 146 corresponding to the space between magnets 150a and 150b constituting the permanent magnet pair 149 shown in FIG. 7 is decreased to increase the reluctance of the portion, the formation of any magnetic loop rather than the closed magnetic path P , that is, the formation of a shorted magnetic path Q is duly prevented. Therefore the reluctance of the section can also be increased even when a nonmagnetic member is disposed in the section described above by developing this conception.

Figure 9:
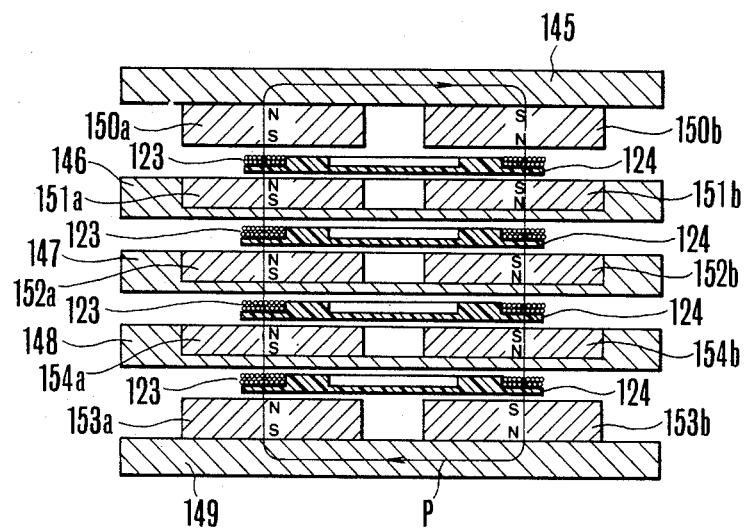

FIGS. 8 and 9 show still another embodiment of this invention in which elements corresponding to those shown in FIGS. 6 and 7 are designated by the same reference numerals. In this case, portions of the intermediate yokes 146–148 that form the closed flux path are made thin and permanent magnet pairs 151, 152 and 154 are disposed at these thin portions. As before, each permanent magnet pair is constituted by two permanent magnets which are magnetized in the opposite directions. This modification can produce larger torque than the embodiment shown in FIGS. 6 and 7 by reducing the height of the assembly and increasing the density of the assembled elements.

Figure 11:
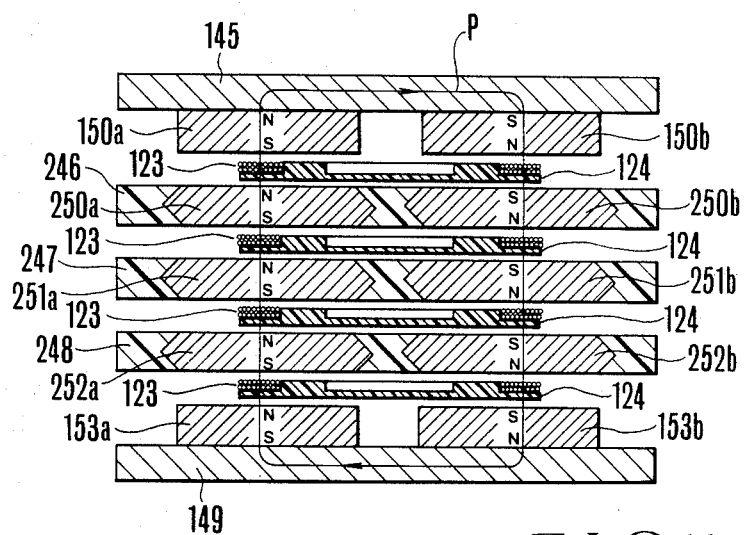
Figure 10:
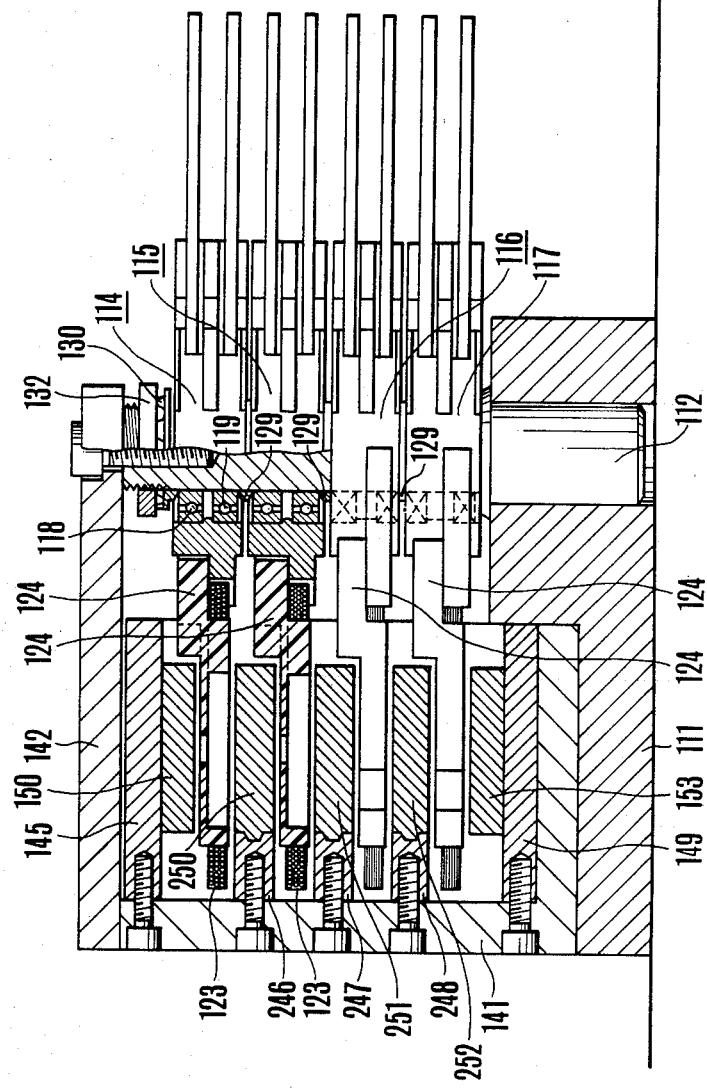

FIGS. 10 and 11 show a modification of the embodiment shown in FIGS. 8 and 9, in which elements same as those shown in FIGS. 6–9 are designated by the same reference numerals. In this embodiment permanent magnet pairs 250, 251 and 252 are disposed at portions of the intermediate yokes at which the closed magnetic path P is formed. Each of the permanent magnet pairs 250–252 is embedded in a supporting member made of such nonmagnetic material as aluminum or synthetic resin. With this construction, leakage of the flux between adjacent magnets can be made smaller than the previous embodiments, thus producing larger driving torque. Similar to FIGS. 8 and 9, as there is no intermediate yoke in the closed magnetic flux path P, the spacing between flat coils can be decreased proportionally, thus increasing the torque. This means that the spacings between stacked magnetic discs can be decreased further to increase the density of the assembled elements.

As above described, according to this invention, coil supporting members carrying flat coils are disposed in air gaps of a magnetic circuit including permanent magnets or in the air gaps between flat magnetic members or the yokes disposed between permanent magnets, and a plurality of swinging members engaging the coil supporting members are mounted on a stationary shaft, the density of the assembled elements can be made high. Accordingly, it is possible to decrease the length of the shaft to a minimum to increase the rigidity of the system, to decrease the mutual interference of vibrations, and to increase the accuracy of positioning the elements.

It should be understood that the invention is not limited to the specific embodiments described above and that many changes and modifications can be made without departing from the scope of the invention as defined in the appended claims.

What is claimed is:

1. A swinging actuator for use in a magnetic memory device comprising:
    a stationary shaft;
    at least two driving assemblies juxtaposed on said stationary shaft and extending in the opposite directions on both sides of said shaft;
    each driving assembly including a head arm, a magnetic head mounted on one end of said head arm, a flat coil having a plane perpendicular to the axis of said shaft, a coil supporting member supporting said coil and extending on one side of said shaft opposite to said head arm; and
    first and second flat permanent magnets spaced from said coil in an axial direction of said shaft, said first and second flat permanent magnets being spaced in a direction of arrangement of said flat coil and magnetized in said axial direction so that poles of the opposite polarities confront said flat coil.

2. The swinging actuator according to claim 1 which further comprises flat magnetic yokes interposed between adjacent flat coils.

3. The swinging actuator according to claim 1 which further comprises spaced third and fourth flat permanent magnets disposed between the flat coils of respective driving assemblies, said third and fourth flat permanent magnets being magnetized to pass magnetic flux in the same direction through a closed magnetic flux path formed by said first and second flat permanent magnets.

4. The swinging actuator according to claim 1 which further comprises a nonmagnetic member surrounding said third and fourth flat permanent magnets.

5. The swinging actuator according to claim 1 which further comprises a flat magnetic yoke interposed between the flat coils of respective driving assemblies, said third flat permanent magnet being magnetized to pass magnetic flux in the same direction through a closed magnetic flux path formed by said first and second flat permanent magnets.

6. The swinging actuator according to claim 5 wherein magnetic reluctance of a portion of said yoke is larger than the other portion of said yoke to which said third and fourth flat permanent magnets are attached.

7. The swinging actuator according to claims 1, 2, 3 or 5 wherein said first and second flat permanent magnets are mounted on a common flat magnetic yoke.

8. The swinging actuator according to claim 1, 2, 3 or 4 wherein each one of said driving assemblies includes a head arm arranged on different magnetic disc planes.

9. The swinging actuator according to claims 1, 2, 3, 4, 5, or 6 wherein said stationary shaft is secured to a subbase at its bottom end and coupled with the rigid magnet housing at its upper end through a connecting plate.

* * * * *